3,585,202
DIBENZANTHRONE TYPE VAT DYES
Charles W. C. Stein, Union, N.J., assignor to
GAF Corporation, New York, N.Y.
No Drawing. Filed Dec. 29, 1967, Ser. No. 694,377
Int. Cl. C07d 37/00
U.S. Cl. 260—274    2 Claims

ABSTRACT OF THE DISCLOSURE

An olive drab vat dyestuff of relatively low infra-red reflectance having the formula:

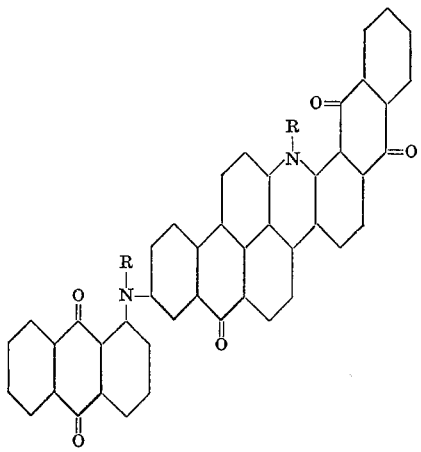

wherein R is alkyl or cycloalkyl of 1–6 carbon atoms.

---

The present invention relates to novel vat dyestuffs of the dibenzanthrone type, and more particularly, to such novel vat dyestuffs of the dibenzanthrone type effective for producing olive drab shades of relatively low infra-red reflectance on cellulosic and similar fibers.

Vat dyestuffs, in general, are well known. Similarly, vat dyestuffs having a dibenzanthrone nucleus are well-known dyestuffs exhibiting a range of colors. Dyestuffs exhibiting an olive drab coloration have generally been employed in warfare to provide camouflage for uniforms, etc. Thus, these dyestuffs have been generally effective in the camouflaging of uniforms since they are capable of blending into the terrain when viewed with light in the visible range. The advent of modern warfare, however, has made such conventional dyestuffs obsolete.

Thus, dyestuffs employed in the camouflaging of uniforms etc. must now be those which are capable of blending into the terrain when viewed with both light in the visible range and when viewed with infra-red light, since there has been increased use of infra-red light in modern warfare. Since the background infra-red reflection of a woodland setting averages somewhere between 20% and 30% infra-red reflection, the percentage reflection of the dyed uniforms or similar articles for which camouflaging is desired must lie in this range in order for those uniforms or other articles to be inconspicuous to the enemy observer. Thus, again, while most vat dyes which have been used in the past for camouflaging military uniforms and similar articles have suitable drab camouflaging colors when viewed in visible light, such dyes show a high degree of reflectance of infra-red light making such dyes completely unsuitable for camouflaging in modern warfare techniques.

Accordingly, there has been a desire for the development of a vat dye or similar dyestuff having a suitable drab camouflaging color for visible light and in addition, a degree of reflectance of infra-red light within a range of 20–30% so as to be inconspicuous when observed under infra-red light conditions.

It has now been found in accordance with the present invention that certain novel vat dyestuffs based upon dibenzanthrone possess the unique characteristics of providing an olive drab coloration suitable for camouflage under visible light and in addition, a low reflectance of infra-red light, making such dyestuffs suitable for camouflage when viewed under infra-red light conditions.

Accordingly, it is a principal object of the present invention to provide novel dyestuffs which are free of the inherent deficiencies and disadvantages of previous dyestuffs.

A further object is to provide novel vat dyestuffs having an olive drab coloration useful for camouflage purposes.

A further object of the present invention is to provide a dibenzanthrone type vat dye having an olive drab coloration and an infra-red reflection of about 20–30% so as to be useful as camouflage when viewed under visible light or infra-red light.

Still further objects and advantages of the novel dyestuffs of the present invention will become more apparent from the following more detailed description thereof.

The novel dyestuffs of the present invention correspond to the formula:

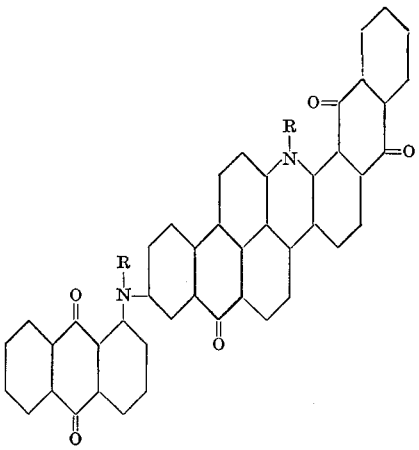

wherein R is selected from the group consisting of alkyl and cycloalkyl radicals of from 1 to about 6 carbon atoms.

Thus, in the above formula, R may comprise a suitable alkyl radical such as: methyl, ethyl, n-propyl, iso-propyl, n-butyl, t-butyl, isobutyl, n-amyl, iso-amyl, n-hexyl, etc.

Similarly, suitable cycloalkyl radicals include: cyclobutyl, cyclopentyl, cyclohexyl, etc.

The preferred compounds of the present invention are those in which R is methyl.

The dyestuffs of the present invention have been found to have a relatively low infra-red reflectance in addition to yielding olive-drab dyes and excellent fastness. Accordingly, the dyestuffs of the present invention have excellent characteristics for military use.

The infra-red reflectances of the dyestuffs of the present invention broadly range from about 10 to about 25 and generally are within the range of 15 to 20. Accordingly, since the infra-red reflectances are in some cases lower than that actually required for good camouflage purposes when the dyeings are viewed under infra-red light, the dyestuffs of the present invention may be admixed with other dyestuffs having higher reflectance values. Accordingly, it is possible to mix the novel dyestuffs of the present invention with other dyestuffs not having the unique characteristics of low infra-red reflectance and still produce a dyestuff composition having a total reflectance within the desired 20–30 percent range.

The novel dyestuffs of the present invention are generally prepared by the reaction of one mole of Bz-1,6-dibromobenzanthrone, with 2 moles of an anthraquinone compound of the formula:

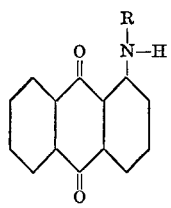

wherein R is as defined above. Suitable amino substituted anthraquinone compounds employed in the production of the novel dyestuffs of the present invention include:

1-methylaminoanthraquinone
1-ethylaminoanthraquinone
1-n-propylaminoanthraquinone
1-isopropylaminoanthraquinone
1-n-butylaminoanthraquinone
1-t-butylaminoanthraquinone
1-n-amylaminoanthraquinone
1-isoamylaminoanthraquinone
1-n-hexylaminoanthraquinone
1-cyclobutylaminoanthraquinone
1-cyclopentylaminoanthraquinone
1-cyclohexylaminoanthraquinone The reaction of Bz-1,6-dibromobenzanthrone with the amino-substituted anthraquinone is generally carried out in the presence of an alkali metal carbonate and a copper catalyst such as cuprous chloride and copper or copper oxide and cupric acetate. The reaction product is isolated and subjected to a ring closure reaction such as a fusion process in the presence of alkali-ethanol. The reaction medium may then be drowned in water, aerated to completely precipitate the desired dyestuff of the present invention and the dyestuff filtered in any conventional manner.

The novel dyestuffs of the present invention can be applied to the fabric to be dyed in any conventional manner. Thus, for example, the dyestuffs may be applied to cellulose such as cotton and other vegetable dyes from an alkali hydrosulfite vat so as to produce olive drab shades of good fastness properties and an infra-red reflectance value of 10 to 25%.

The vat dyestuffs of the present invention possess the high degree of fastness generally associated with vat dyeing. The principle of vat dyeing is to reduce the water-insoluble dye to a derivative which is soluble in alkali. This derivative is almost always lighter in color than the dye itself and frequently colorless. The fiber or fabric to be dyed, e.g., cellulosic or other synthetic fabric, is then steeped in the alkaline solution or suspension of the reduction product with subsequent exposure of the dyed fiber or fabric to the air. The oxygen in the air re-oxidizes the alkali-soluble dye on the fiber or fabric and the oxidation product, the desired dye, adheres to the fiber or fabric, presumably by absorption forces to produce a very fast dyeing. Accordingly, the novel dyestuffs of the present invention possess the general characteristic associated with all vat dyestuffs; that is, the ability to be easily reduced and readily re-oxidized to the original dye.

The present invention will now be described by reference to the following specific examples. It is noted, however, that such examples are presented for purposes of illustration only, and the present invention is in no way to be deemed as limited thereto.

EXAMPLE 1

(a) A mixture of 920 parts nitrobenzene, 100 parts Bz-1,6-dibromobenzanthrone, 122 parts of 1-methylaminoanthraquinone, 66 parts sodium carbonate, 3.0 parts cuprous chloride and 1.0 part copper is refluxed with slight distillation until the reaction is essentially complete. The reaction medium is cooled to room temperature, filtered, washed with ethyl alcohol and dried. Residual bromine analysis is 3.4%.

(b) 30 parts of the product from the above condensation are heated with a fused mixture of 54 parts potassium hydroxide flakes and 67 parts of ethanol at a temperature of 115–120° C. for 2 hours. The fusion is worked up by adding water and distilling off the ethanol, followed by drowning in water, aerating and filtering.

The presscake, when converted into a dyestuff paste using sodium lignin sulfonate as dispersing agent, dyed cotton from the vat in fast olive green shades showing infra-red reflectance values of 15–20%. The dyestuff corresponded to the formula:

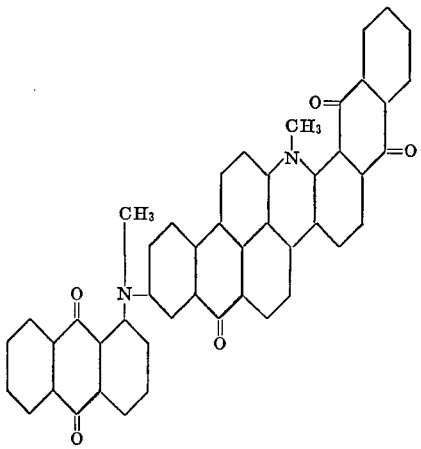

EXAMPLE 2

The process of Example 1 is repeated except that in lieu of the 1-methylaminoanthraquinone, equivalent amounts of the following substituted aminoanthraquinones are employed:

(a) 1-ethylaminoanthraquinone
(b) 1-isopropylaminoanthraquinone
(c) 1-t-butylaminoanthraquinone
(d) 1-n-amylaminoanthraquinone
(e) 1-n-hexylaminoanthraquinone
(f) 1-cyclopentylaminoanthraquinone
(g) 1-cyclohexylaminoanthraquinone In all cases, the dyestuffs provide excellent olive drab dyeings on cellulosic and similar fabrics useful in the production of camouflage military uniforms. In all cases, the infra-red reflectance is between 10 and 25%.

While the present invention has been described primarily with respect to the foregoing specific examples, it is to be understood that the present invention is in no way to be deemed as limited thereto, but should be construed as broadly as all or any equivalents thereof.

I claim:
1. A dyestuff of the formula
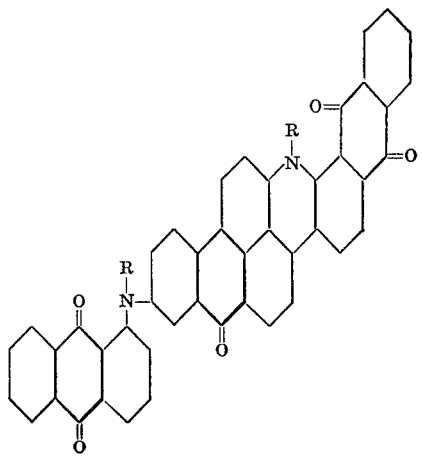
wherein R is $C_{1-6}$ alkyl or $C_{4-6}$ cycloalkyl.
2. A dyestuff as defined in claim 1 wherein R is methyl.
References Cited
UNITED STATES PATENTS
2,791,587  5/1957  Caliezi et al. _____ 260—272
3,027,374  3/1962  Von et al. _____ 260—274
DONALD G. DAUS, Primary Examiner
U.S. Cl. X.R.
8—34; 260—378